(12) United States Patent
Rabasco et al.

(10) Patent No.: US 9,663,607 B2
(45) Date of Patent: May 30, 2017

(54) HEUR THICKENER AND PROCESS FOR ITS PREPARATION

(71) Applicant: Rohm and Haas Company, Philadelphia, PA (US)

(72) Inventors: John J. Rabasco, Allentown, PA (US); Antony K. Van Dyk, Blue Bell, PA (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 202 days.

(21) Appl. No.: 14/522,744

(22) Filed: Oct. 24, 2014

(65) Prior Publication Data

US 2015/0119525 A1 Apr. 30, 2015

Related U.S. Application Data

(60) Provisional application No. 61/896,379, filed on Oct. 28, 2013.

(51) Int. Cl.

| | | |
|---|---|---|
| *C08G 18/00* | (2006.01) | |
| *C08G 18/08* | (2006.01) | |
| *C08G 18/10* | (2006.01) | |
| *C08G 18/28* | (2006.01) | |
| *C08G 18/48* | (2006.01) | |
| *C08G 18/73* | (2006.01) | |
| *C09D 7/00* | (2006.01) | |

(52) U.S. Cl.
CPC ....... *C08G 18/4833* (2013.01); *C08G 18/003* (2013.01); *C08G 18/08* (2013.01); *C08G 18/10* (2013.01); *C08G 18/2875* (2013.01); *C08G 18/73* (2013.01); *C09D 7/002* (2013.01)

(58) Field of Classification Search
CPC .... C08G 18/4833; C08G 18/08; C08G 18/73; C08G 18/003; C08G 18/10; C08G 18/2875; C09D 7/002
See application file for complete search history.

(56) References Cited

U.S. PATENT DOCUMENTS

| 4,155,892 A | 5/1979 | Emmons et al. | |
|---|---|---|---|
| 2007/0004815 A1* | 1/2007 | Narayan-Sarathy | ... B01J 19/123 522/1 |
| 2008/0108775 A1* | 5/2008 | Schieferstein | ........... A61K 8/87 528/66 |
| 2009/0247657 A1* | 10/2009 | Kaplan | .............. C08G 18/4202 521/137 |
| 2012/0226075 A1 | 9/2012 | Leutfeld et al. | |
| 2012/0322896 A1 | 12/2012 | Suau et al. | |
| 2014/0343226 A1* | 11/2014 | Burckhardt | ............... C07F 9/94 524/871 |

FOREIGN PATENT DOCUMENTS

| EP | 0460328 A1 | 12/1991 |
|---|---|---|
| EP | 0905157 A1 | 3/1999 |
| EP | 2455412 A1 | 5/2012 |

* cited by examiner

*Primary Examiner* — Patrick Niland
(74) *Attorney, Agent, or Firm* — Reid S. Willis

(57) ABSTRACT

The present invention is a process for preparing an aqueous solution of a hydrophobically modified alkylene oxide poly (urethane-urea-allophanate) thickener by contacting isocyanate reactive groups with a stoichiometric excess of a diisocyanate, followed by reaction with water. The thickener surprisingly shows a maintenance or improvement in hiding in paint formulations while maintaining other critical rheological properties.

17 Claims, No Drawings

HEUR THICKENER AND PROCESS FOR ITS PREPARATION

Hydrophobically modified urethane thickeners (HEURs) are water soluble polymers containing hydrophobic groups, and are classified as associative thickeners because the hydrophobic groups associate with one another in water. In a latex paint formulation, the hydrophobic groups adsorb to latex particle surfaces, thereby creating loops and bridges between particles, to form a transient network of bridged latex particles that gives rise to viscosity increase and desirable rheological characteristics over a wide range of shear rates. HEURs generally provide excellent flow/leveling and gloss properties while maintaining acceptable sag resistance.

HEURs are typically prepared by a bulk melt polymerization process or an organic solvent based process. In the bulk melt polymerization process, a polyalkyleneglycol, such as PEG 8000 polyethylene glycol is reacted with a molar equivalent excess of diisocyanate in the presence of a metal catalyst to provide a targeted molecular weight of the polymerized polymer. A capping agent, which is typically a monofunctional alcohol or amine, is then added to quench any remaining isocyanate functionality, and the molten polymer is then dissolved in water or a mixture of water and an organic solvent to produce the final product. Alternatively, the polyglycol, diisocyanate, and capping alcohol can be added to the reactor upfront in an appropriate ratio to form the HEUR polymer. In either case, hydroxyl equivalents are higher compared to isocyanate equivalents to completely consume all isocyanate groups prior to dissolving the HEUR polymer in water or a water/solvent mixture.

Although HEURs impart desirable rheological properties to coating formulations, it is well known that their use in such formulations adversely impacts hiding, tint strength, and opacity of the consequently coated substrate. Therefore, multiple coatings are often required to achieve the desired hiding of the color and appearance of the original surface.

It is known that improvement in the spacing of pigment particles (e.g., $TiO_2$) in the coatings formulation improves opacity and hiding efficiency; nevertheless, the transient network of bridged latex particles in HEURs crowds the pigment particles into interstitial spaces, thereby decreasing the spacing between pigment particles, and resulting in a concomitant loss in opacity, tint strength, and hiding.

It would therefore be an advance in the art of HEUR thickened coatings compositions to discover a HEUR that imparts improved opacity, tint strength, and hiding to a coating composition.

SUMMARY OF THE INVENTION

In a first aspect, the present invention relates to a process for preparing an aqueous solution of a hydrophobically modified alkylene oxide poly(urethane-urea-allophanate) thickener comprising the steps of: a) contacting under reactive conditions 1) a water-soluble polyalkylene glycol; 2) a hydrophobic capping agent or a hydrophobic difunctional agent or a combination thereof; and 3) a 2 to 50 percent stoichiometric excess of a diisocyanate with respect to the sum of the moles of isocyanate reactive groups of the polyalkylene glycol and the capping agent or the hydrophobic difunctional agent or a combination thereof, to form a polyurethane prepolymer with isocyanate functionality; then b) contacting the prepolymer with water under conditions sufficient to convert the prepolymer to an aqueous solution of a hydrophobically modified alkylene oxide poly(urethane-urea-allophanate). The thickener prepared by the process of the invention addresses a need in the art of paint formulations, by providing improved rheological properties to the formulation without suffering a loss in opacity.

DETAILED DESCRIPTION OF THE INVENTION

The present invention relates to a process for preparing an aqueous solution of a hydrophobically modified alkylene oxide poly(urethane-urea-allophanate) thickener comprising the steps of: a) contacting under reactive conditions 1) a water-soluble polyalkylene glycol; 2) a hydrophobic capping agent or a hydrophobic difunctional agent or a combination thereof; and 3) a 2 to 50 percent stoichiometric excess of a diisocyanate with respect to the sum of the moles of isocyanate reactive groups of the polyalkylene glycol and the capping agent or the hydrophobic difunctional agent or a combination thereof, to form a polyurethane prepolymer with isocyanate functionality; then b) contacting the prepolymer with water under conditions sufficient to convert the prepolymer to an aqueous solution of a hydrophobically modified alkylene oxide poly(urethane-urea-allophanate). The hydrophobically modified alkylene oxide poly(urethane-urea-allophanate) may further include additional functionality such as amine functionality.

As used herein, the term "water-soluble polyalkylene glycol" refers to one or more water-soluble polyethylene oxides, water-soluble polyethylene oxide/polypropylene oxide copolymers, water-soluble polyethylene oxide/polybutylene oxide copolymers, and polyethylene oxide/polypropylene oxide/polybutylene oxide terpolymers. As used herein, the term propylene oxide refers to either a polymer having —$(OCH_2CH_2CH_2)$— and/or —$(OCH(CH_3)CH_2)$— repeating groups.

Preferred water-soluble polyalkylene glycols are polyethylene glycols, particularly polyethylene glycols having a weight average molecular weight ($M_w$) in the range of from 2000 to 11,000 Daltons, preferably in the range of from 4000 to 10,000 Daltons. An example of a suitable polyethylene glycol is PEG 8000, which is commercially available as CARBOWAX™ 8000 Polyethylene Glycol (a trademark of The Dow Chemical Company or its Affiliates).

The diisocyanate is preferably a $C_4$-$C_{20}$ aliphatic or aromatic diisocyanate, or a combination thereof. As used herein, "aliphatic" refers to saturated or partially unsaturated linear-, branched-, or cycloaliphatic, or combinations thereof. Examples of suitable diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, isophorone diisocyanate, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate. Aliphatic diisocyanates are preferred, with 1,6-hexamethylene diisocyanate (HDI), isophorone diisocyanate (IPDI), and 4,4'-methylenebis(isocyanatocyclohexane) ($H_{12}$-MDI) being more preferred.

As used herein, the term "hydrophobic capping agent" refers to a monofunctional compound comprising six or more carbon atoms that has a hydrophobic portion and that contains an isocyanate reactive group; as used herein, the term "isocyanate reactive group" refers to an OH group or a $NHR^1$ group, where $R^1$ is H or a $C_1$-$C_{20}$ alkyl group.

Preferably the hydrophobic capping agent is an alcohol or an alkoxlyate thereof; an amine; or a tertiary aminoalcohol, or an alkoxlyate thereof.

Examples of suitable alcohols include n-octanol, n-nonanol, n-decanol, n-undecanol, n-dodecanol, 2-ethylhexanol, 2-butyl-1-octanol, and 3,7-dimethyl-1-octanol. Examples of suitable amines include n-hexyl amine, n-octyl amine, n-decyl amine, n-dodecyl amine, benzyl amine, di-n-hexyl amine, 2-ethylhexyl amine, dicyclohexyl amine, and dibenzyl amine. Examples of suitable tertiary aminoalcohols and alkoxylates thereof include reaction products of dialkyl amines and epoxies or dialkyl amines and alkyl glycidyl ethers; examples of suitable dialkyl amines include dimethylamine, diethylamine, dipropylamine, diisopropylamine, dibutylamine, diamylamine, dihexylamine, bis-(2-ethylhexyl)amine, dicyclohexylamine, and dibenzylamine; examples of suitable epoxies include ethylene oxide, propylene oxide, butylene oxide, 1,2-epoxydecane and 1,2-epoxydodecane; and examples of suitable alkyl glycidyl ethers include isopropyl glycidyl ether, butyl glycidyl ether, isobutyl glycidyl ether, 2-ethylhexyl glycidyl ether, phenyl glycidyl ether, t-butyl phenyl glycidyl ether. Examples of other suitable alkoxylated hydrophobic capping agents include the product of a branched alcohol such as 2-butyl-Foctanol or a linear alcohol such as n-dodecanol, with an ethylene oxide, a propylene oxide, or a butylene oxide.

Further examples of reagents that can be used to generate hydrophobic capping agents with tertiary amine functionality include amino alcohols suitably prepared from the reaction of secondary amines and glycidyl ethers, where the amino alcohols are characterized by Formula I:

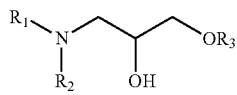

I wherein $R_1$, $R_2$, and $R_3$ are each independently $C_1$-$C_{12}$ linear branched or cyclic alkyl groups or benzyl groups or combinations thereof.

As used herein, the term "hydrophobic difunctional agent" is a difunctional compound with a hydrophobic portion and two isocyanate reactive groups. Examples include alkyldiamines such as 1,2-octanediamine, 1,2-decanediamine, 1,2-dodecanediamine, 1,2-ethanediamine, propanediamines, 1,6-hexanediamines, and 1,10-decanediamine; and alkyl diols such as 1,2-octanediol, 1,2-decanediol, 1,2-dodecanediol, 1,2-ethanediol, propanediols, 1,6-hexanediol, and 1,10-decanediol. Further examples of reagents that can be used to generate hydrophobic difunctional agents with at a tertiary amine group include the class of diols of Formula II:

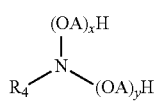

II wherein —(OA)- are $C_2$-$C_4$ oxyalkylene groups, preferably oxyethylene groups; $R_4$ is preferably a $C_4$-$C_{30}$ linear, branched, or cyclic, saturated or unsaturated, aliphatic or aromatic group, or a combination thereof; and x and y are at least 1, and x+y is from 2 to 100. Examples of diols of Formula II include bis(2-hydroxyethyl)cetylamine, bis(2-hydroxyethyl)stearylamine, polyethoxylated tallow amines, bis(2-hydroxyethyl)soya amine, bis(2-hydroxyethyl) isodecyloxypropylamine, bis(2-hydroxyethyl) isotridecyloxypropylamine, bis(2-hydroxyethyl) linear alkyloxypropylamine, and their alkoxylates. Other representative diols include bis(hydroxyethyl)decylamine, and bis(hydroxyethyl)dodecylamine. Any of the corresponding amine oxides of compounds of Formula II are also suitable hydrophobic difunctional agents. These reagents would be used to provide hydrophobic groups located within and pendant to the polymer chain.

Other suitable hydrophobic difunctional agents include a class of diols advantageously prepared by the reaction of a secondary amine and a diglycidyl ether, for example, the reaction product of bis(2-ethylhexyl)amine and 1,4-butane diol diglycidyl ether.

Still other suitable hydrophobic difunctional agents include the reaction product of a dialkylamine and glycidol, examples of which reaction products include 3-(diethylamino)-1,2-propanediol, 3-(diisopropylamino)-1,2-propanediol, 3-(dibutylamino)-1,2-propanediol, 3-(diamylamino)-1,2-propanediol, 3-(dihexylamino)-1,2-propanediol, 3-(dioctylamino)-1,2-propanediol, 3-[bis(2-ethylhexyl)amino]-1,2-propanediol, 3-(dibenzylamino)-1,2-propanediol, and 3-(dicyclohexylamino)-1,2-propanediol.

In one preferred process of the present invention, the polyalkylene glycol and the hydrophobic capping agent or the hydrophobic difunctional agent or mixtures thereof are mixed and heated together, preferably at a temperature in the range of 50° C. to 110° C., optionally in the presence of a small amount of an antioxidant such as butylated hydroxytoluene (BHT). A stoichiometric excess of the diisocyanate, preferably from 5 to 35 percent stoichiometric excess with respect to the isocyanate reactive groups, is then added along with a urethane promoting catalyst, preferably bismuth octoate. Preferably, the mole equivalent ratio of the polyalkylene glycol to the capping agent is from 2:1 to 10:1, more preferably from 3:1 to 8:1; and most preferably from 3.5:1 to 6.5:1.

The diisocyanate, the polyalkylene glycol, and the hydrophobic capping or difunctional agent need not be contacted together under reaction conditions at the same time so long as isocyanate groups are present before the water addition step. For example, it is possible to first contact the polyalkylene glycol and the diisocyanate under reaction conditions as described hereinabove to form a first prepolymer intermediate, then contacting the hydrophobic capping agent or the hydrophobic difunctional agent or mixtures thereof with the first prepolymer intermediate under reaction conditions to form a second prepolymer intermediate, which is then contacted with water at elevated temperature to form the aqueous solution of the thickener. When the hydrophobic capping agent or the hydrophobic difunctional agent comprise a tertiary amine, an acid such as acetic acid, polyacrylic acid, lactic acid, or gluconic acid is advantageously added to the solution to adjust pH and decrease the solution viscosity.

It has been discovered that HEUR based polymers produced as described herein are not merely urethane polymers with terminal and/or pendant hydrophobic groups required for associative thickening but further include combinations of allophanate branch points in the polymer backbone and urea linkages. The HEUR based polymers may further include primary amine end groups or biuret branch points in the polymer backbone or a combination thereof.

EXAMPLES

Abbreviations

| Ingredient | Abbreviation |
| --- | --- |
| Ti-Pure R-746 TiO$_2$ | TiO$_2$ |
| RHOPLEX ™ VSR 1050 LOE Binder | VSR 1050 |
| RHOPLEX ™ SG-10M Binder | SG-10M |
| TAMOL ™ 731 Dispersant | Dispersant |
| Texanol Coalescent | Coalescent |
| KATHON ™ 1.5% Biocide | Biocide |
| ACRYSOL ™ RM-2020E Rheology Modifier | RM-2020E |
| ACRYSOL ™ RM-825 Rheology Modifier | RM-825 |
| TERGITOL ™ 15-S-9 Surfactant | Surfactant |
| Foamstar A-10 Defoamer | Defoamer |

RHOPLEX, TAMOL, KATHON, ACRYSOL, and TERGITOL are all Trademarks of The Dow Chemical Company or Its Affiliates.

Intermediate 1

Preparation of Hydrophobic Capping Agent

Diamylamine (372.4 g), butyl glycidyl ether (346.2 g) and water (27 g) were heated to reflux (105-115° C.) under N$_2$ in a round bottom flask equipped with a condenser and mechanical stirrer. After 5 h, the mixture was cooled to 30° C. The aminoalcohol capping agent was isolated after water and residual butyl glycidyl ether were removed in vacuo (14 Torr) over a temperature range of 30° C. to 150° C.

Example 1

Isocyanate Functional HEUR Polymer Preparation, 10% Mole Excess NCO

CARBOWAX™ 8000 Polyethylene Glycol (PEG, a Trademark of the Dow Chemical Company or its Affiliates, M$_w$=8200; 130.09 g, 31.7 mmol equiv OH) was heated to 110° C. in vacuo in a batch melt reactor for 2 h. After cooling the reactor contents to 85° C., butylated hydroxyl toluene (BHT, 0.067 g) and Intermediate 1 (2.14 g, 7.5 mmol equiv OH) were added to the reactor and allowed to mix for 5 min. Hexamethylene diisocyanate (HDI, 3.62 g, 43.1 mmol equiv NCO) was then added to the reactor and mixing was continued for 5 min. Bismuth octoate solution (28%, 0.33 g) was then added to the reactor and the temperature of the mixture was maintained at 85° C. with stirring for 10 min. The resulting molten polymer was dropped into 50° C. water (529.99 g) and stirred until completely dissolved. Lactic acid (6.66 g) was then added to the mixture.

Additional samples were prepared substantially as described in Example 1 with differing amounts of PEG, HDI, and Int 1, except that water was added to the molten polymer in each case. The amounts of each component are shown in Table 1 and the ratios of isocyanate mole equivalents to total OH mole equivalents (HDI:OH) and the ratios of mole equivalents of PEG to mole equivalents of Intermediate 1 (PEG:Int 1) as shown in Table 2.

TABLE 1

Amounts of PEG, HDI, and Int 1

| Example | PEO (g) | HDI (g) | Int-1 (g) |
| --- | --- | --- | --- |
| 1 | 130.09 | 3.62 | 2.14 |
| 2 (7541) | 130.09 | 4.40 | 4.56 |
| 3 (7534) | 130.09 | 3.42 | 1.52 |
| 4 (7540) | 130.09 | 5.20 | 4.56 |
| 5 (7537) | 130.09 | 4.05 | 1.52 |
| 6 (7538) | 130.09 | 4.00 | 2.28 |

TABLE 2

Mole Ratios of HDI:OH and PEG:Int 1

| Example | HDI:OH | PEG:Int 1 |
| --- | --- | --- |
| 1 | 1.1 | 4 |
| 2 (7541) | 1.10 | 2.03 |
| 3 (7534) | 1.10 | 6.14 |
| 4 (7540) | 1.31 | 2.00 |
| 5 (7537) | 1.29 | 6.08 |
| 6 (7538) | 1.21 | 4.06 |

The rheology modifiers were evaluated in acrylic latex paints. Table 3 shows a standard VSR-1050 paint formulation using commercial rheology modifiers. The ingredients were added in the order shown in the table.

TABLE 3

VSR-1050 Paint Formulation with Commercial Rheology Modifiers

| Grind | Amount (g) |
| --- | --- |
| TiO$_2$ | 49.06 |
| LetDown | |
| VSR 1050 | 111.50 |
| add grind to binder with stirring | |
| Dispersant | 1.05 |
| Coalescent | 4.46 |
| Biocide | 0.40 |
| Total Letdown | 166.47 |
| Water | 29.33 |
| RM-2020E | 4.50 |
| RM-825 | 0.20 |
| Surfactant | 0.40 |
| Defoamer | 0.20 |
| adjust to pH = 9.0 | |
| Totals | 201.1 |

Table 4 shows VSR 1050 paint formulations with varying amounts of the rheology modifiers of the present invention. In each formulation, Letdown (166.47 g) and Surfactant (0.40 g) were used. T$_o$ refers to initial temperature and pH$_o$ refers to initial pH.

TABLE 4

Paint Formulations

| | | | | | | | |
|---|---|---|---|---|---|---|---|
| RM-2020E (g) | 4.80 | 0.30 | | | 1.04 | 0.78 | |
| RM-825 (g) | 0.21 | 0.14 | 0.22 | | | | |
| Ex 1 (g) | | | 5.26 | | | | |
| Ex. 2 (g) | | | | | | | 2.2 |
| Ex. 3 (g) | | | | 3.20 | | | |
| Ex. 4 (g) | | | | | | 1.72 | |
| Ex. 5 (g) | | | | | 2.71 | | |
| Ex 6 (g) | | | | | | 1.76 | |
| RM dry #/100 gal | 5.06 | 5.37 | 4.54 | 3.54 | 3.35 | 3.04 | 2.88 |
| Defoamer (g) | 0.20 | 0.20 | 0.20 | 0.20 | 0.20 | 0.20 | 0.20 |
| Ammonia (28% aq, g) | 0.11 | 0.13 | 0.17 | 0.19 | 0.18 | 0.13 | 0.15 |
| Water (g) | 28.90 | 28.20 | 30.44 | 31.13 | 31.05 | 31.40 | 25.09 |
| Totals (g) | 206.15 | 206.47 | 205.64 | 204.64 | 204.45 | 204.14 | 197.39 |
| $T_o$ (° C.) | 22.3 | 23.0 | 22.9 | 23.0 | 22.9 | 23.0 | 23.0 |
| $pH_o$ | 9.05 | 8.64 | 9.03 | 9.19 | 9.16 | 9.04 | 8.96 |
| KU (Krebs units) | 97.0 | 97.7 | 102.3 | 97.9 | 95.6 | 102.6 | 102.7 |
| ICI | 1.25 | 1.20 | 1.25 | 1.28 | 1.40 | 1.17 | 1.20 |
| Equilibrated results 25° C. | | | | | | | |
| pH | 9.00 | 8.74 | 9.04 | 9.05 | 9.05 | 8.91 | 8.91 |
| 3-day KU (Krebs units) | 98.9 | 100.3 | 104.0 | 98.9 | 97.9 | 104.4 | 104.6 |
| ICI (Poise) | 1.25 | 1.25 | 1.50 | 1.40 | 1.50 | 1.20 | 1.25 |
| Brookfield spindle 4/6 rpm (cps) | 4300 | 9100 | 9000 | 8000 | 5100 | 6300 | 6300 |
| Gloss 20 degrees | 51.4 | 46.4 | 51.2 | 51.5 | 50.7 | 47.0 | 46.1 |
| Gloss 60 degrees | 77.2 | 73.9 | 76.3 | 76.3 | 76.4 | 76.0 | 74.7 |
| Flow/leveling | 10 | 2 | 6 | 5 | 9 | 10 | 10 |
| Sag resistance | 16 | 24 | 18 | 20 | 18 | 14 | 18 |

KU measurements were made with a BYK Gardner KU-1+ viscometer; ICI was measured with an ICI cone and plate viscometer; and Brookfield measurements were made with a Brookfield LVDV-I+ viscometer. The flow and leveling range is 1 to 10 with 10 showing the best flow; the sag resistance range is 2 to 24, with 24 being the most resistant to sagging.

Table 5 shows SG-10M paint formulation with commercial rheology modifiers.

TABLE 5

SG-10M Paint Formulation with Commercial Rheology Modifiers

| Grind | Amount (g) |
|---|---|
| TiO$_2$ | 49.06 |
| LetDown | |
| SG-10M | 111.50 |
| add grind to binder with stirring | |
| Dispersant | 1.05 |
| Coalescent | 4.46 |
| Biocide | 0.40 |
| Total Letdown | 166.47 |
| Water | 29.33 |
| 2020E | 4.50 |
| RM-825 | 0.20 |
| Surfactant | 0.40 |
| Defoamer | 0.20 |
| adjust to pH = 9.0 | |
| Totals | 201.1 |

Table 6 shows paint formulations with various amounts of rheology modifiers of the present invention. In each formulation, Letdown (166.47 g) and Surfactant (0.40 g) were used. $T_o$ refers to initial temperature and $pH_o$ refers to initial pH.

| | | | | | | | |
|---|---|---|---|---|---|---|---|
| RM-2020E (g) | 4.80 | 0.29 | | | 1.04 | 0.80 | |
| RM-825 (g) | 0.21 | 0.14 | 0.22 | | | | |
| Ex 1 (g) | | | 5.26 | | | | |
| Ex. 2 (g) | | | | | | | 2.2 |
| Ex. 3 (g) | | | | 3.20 | | | |
| Ex. 4 (g) | | | | | | 1.72 | |
| Ex. 5 (g) | | | | | 2.71 | | |
| Ex. 6 (g) | | | | | | 1.76 | |
| Defoamer (g) | 0.20 | 0.20 | 0.20 | 0.20 | 0.20 | 0.20 | 0.20 |
| Ammonia (28% aq, g) | 0.11 | 0.13 | 0.14 | 0.11 | 0.11 | 0.12 | 0.15 |
| Water (g) | 28.9 | 28.2 | 30.46 | 31.2 | 31.11 | 31.38 | 31.67 |
| Totals (g) | 201.09 | 201.09 | 201.09 | 201.09 | 201.09 | 201.09 | 201.09 |
| $T_o$ ° C. | 21.0 | 22.8 | 22.7 | 22.9 | 22.9 | 23.0 | 22.7 |
| $pH_o$ | 8.99 | 8.91 | 9.03 | 8.93 | 9.00 | 9.02 | 9.06 |
| KU (Krebs units) | 103.5 | 100.3 | 105.4 | 100.2 | 96.0 | 103.5 | 103.7 |
| ICI | | 1.00 | 1.35 | 1.10 | 1.10 | 1.05 | 1.40 |

-continued

| | | | | | | |
|---|---|---|---|---|---|---|
| Equilibrated results 25° C. | | | | | | |
| pH | 8.93 | 8.80 | 8.86 | 8.84 | 8.84 | 8.87 | 8.92 |
| 3-day KU (Krebs units) | 104.0 | 101.8 | 107.2 | 99.2 | 99.2 | 106.2 | 106.8 |
| ICI (Poise) | 1.10 | 1.09 | 1.20 | 1.10 | 1.10 | 1.05 | 1.29 |
| Brookfield spindle 4/6 rpm (cps) | 6300 | 9700 | 11100 | 5700 | 5700 | 8000 | 8200 |
| Gloss 20 degrees | 40.2 | 44.7 | 42.9 | 44.2 | 40.8 | 31.8 | 35.6 |
| Gloss 60 degrees | 75.3 | 74.6 | 74.1 | 75.5 | 75.2 | 71.4 | 74.1 |
| Flow/leveling | 10 | 3 | 3 | 4 | 9 | 9 | 9 |
| Sag resistance | 16 | 24 | 24 | 24 | 14 | 14 | 18 |

The results in Tables 4 and 6 show that paint formulations containing the rheology modifiers of the present invention show acceptable KU and ICI stability over 3 days, as well as acceptable gloss, flow/leveling, and sag resistance.

Table 7 is an illustration of hiding efficiency (S/mil) of the paint formulation as calculated according to the Kubleka-Munk S/mil Test method.

TABLE 7

Hiding Efficiency of Paint Formulations

| Rheology Modifier | Binder | HDI:OH | PEO:Int-1 | S/mil |
|---|---|---|---|---|
| RM-825 | VSR 1050 | NA | NA | 5.93 |
| Ex. 1 | VSR 1050 | 1.1 | 4 | 7.14 |
| Ex. 2 | VSR 1050 | 1.1 | 2 | 3.63 |
| Ex. 3 | VSR 1050 | 1.1 | 6 | 6.72 |
| Ex. 4 | VSR 1050 | 1.3 | 2 | 3.18 |
| Ex. 5 | VSR 1050 | 1.3 | 6 | 6.66 |
| Ex. 6 | VSR 1050 | 1.2 | 4 | 5.99 |
| RM-2020E + RM-825 | SG-10M | NA | NA | 5.57 |
| Ex 1 | SG-10M | | | 6.30 |
| Ex. 2 | SG-10M | 1.1 | 2 | 3.28 |
| Ex. 3 | SG-10M | 1.1 | 6 | 6.33 |
| Ex. 4 | SG-10M | 1.3 | 2 | 4.32 |
| Ex. 5 | SG-10M | 1.3 | 6 | 6.22 |
| Ex. 6 | SG-10M | 1.2 | 4 | 5.58 |

The results show that experimental rheology modifiers that have a PEO:Intermediate 1 in the range of 4 to 6 give especially high S/mil values. Although HEURs in general are known to have an adverse impact on hiding in paint formulations, the rheology modifiers of the present invention do not substantially diminish hiding and, in some cases, surprisingly show an improvement in hiding while retaining other critical rheological properties such as KU and ICI efficiency, flow/leveling, and sag resistance.

Kubelka-Munk S/mil Test Method

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The Y-reflectance was measured using a BYK Gardner 45° Reflectomer in each of the scribed areas five times measuring on a diagonal starting at the top of the rectangle and the average Y-reflectance recorded. A thick film draw down was prepared for each paint on Black Vinyl Charts (Leneta Form P121-10N) using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1-R^2)} \times \ln\frac{1-(R_B \times R)}{1-\frac{R_B}{R}} \quad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in$^2$.

$$X(mils) = \frac{W_{pf}(g) \times 1000(mil/in)}{D(lbs/gal) \times 1.964(g/in^3/lbs/gal) \times A(in)}$$

The invention claimed is:

1. A process for preparing an aqueous solution of a hydrophobically modified alkylene oxide poly(urethane-urea-allophanate) thickener consisting of the steps of: a) contacting under reactive conditions 1) a water-soluble polyalkylene glycol; 2) a hydrophobic capping agent or a hydrophobic difunctional agent or a combination thereof; and 3) a 2 to 50 percent stoichiometric excess of a diisocyanate with respect to the sum of the moles of isocyanate reactive groups of the polyalkylene glycol; and ii) the capping agent or the hydrophobic difunctional agent or a combination thereof, to form a polyurethane prepolymer with isocyanate functionality; then b) contacting the prepolymer with water under conditions sufficient to convert the prepolymer to an aqueous solution of a hydrophobically modified alkylene oxide poly(urethane-urea-allophanate).

2. The process of claim 1 wherein the polyalkylene glycol is a polyethylene glycol, the diisocyanate is 1,6-hexamethylene diisocyanate, isophorone diisocyanate, or 4,4'-methylenebis(isocyanatocyclohexane).

3. The process of claim 2 wherein the diisocyanate is used at a 5 to 35 percent stoichiometric excess with respect to the sum of the moles of isocyanate reactive groups of the polyalkylene glycol and the capping agent, wherein the polyalkylene glycol is a polyethylene glycol having a $M_w$ in the range of 4000 to 10,000 Daltons; and the hydrophobic agent is a hydrophobic capping agent.

4. The process of claim 3 wherein the hydrophobic capping agent is an alcohol or a tertiary aminoalcohol.

5. The process of claim 4 wherein equivalent ratio of the polyalkylene glycol to the alcohol or tertiary amino alcohol is from 2:1 to 10:1.

6. The process of claim 5 wherein equivalent ratio of the polyalkylene glycol to the alcohol or tertiary amino alcohol is from 3.5:1 to 6.5:1, wherein the hydrophobic capping agent is a tertiary aminoalcohol.

7. The process of claim 5 wherein the hydrophobically modified alkylene oxide poly(urethane-urea-allophanate) further includes primary amine end groups or biuret branch points in the polymer backbone or a combination thereof.

8. The process of claim 1 wherein the polyalkylene glycol, the diisocyanate, and the hydrophobic capping agent or the hydrophobic difunctional agent or a combination thereof are contacted simultaneously under reaction conditions to form the polyurethane prepolymer with isocyanate functionality.

9. The process of claim 1 wherein the polyalkylene glycol and the diisocyanate are first contacted with each other under reaction conditions to form a first prepolymer intermediate, which is then contacted with the hydrophobic capping agent or the hydrophobic difunctional agent or a combination thereof under reaction conditions to form a second prepolymer intermediate, which is then contacted with water to form the aqueous solution of a hydrophobically modified alkylene oxide poly(urethane-urea-allophanate).

10. A process for preparing an aqueous solution of a hydrophobically modified alkylene oxide poly(urethane-urea-allophanate) thickener comprising the steps of: a) contacting under reactive conditions and in the presence of a bismuth octoate catalyst 1) a water-soluble polyalkylene glycol; 2) a hydrophobic capping agent or a hydrophobic difunctional agent or a combination thereof; and 3) a 2 to 50 percent stoichiometric excess of a diisocyanate with respect to i) the sum of the moles of isocyanate reactive groups of the polyalkylene glycol; and ii) the capping agent or the hydrophobic difunctional agent or a combination thereof, to form a polyurethane prepolymer with isocyanate functionality; then b) contacting the prepolymer with water under conditions sufficient to convert the prepolymer to an aqueous solution of a hydrophobically modified alkylene oxide poly(urethane-urea-allophanate).

11. The process of claim 10 wherein the polyalkylene glycol is a polyethylene glycol, the diisocyanate is 1,6-hexamethylene diisocyanate, isophorone diisocyanate, or 4,4'-methylenebis(isocyanatocyclohexane).

12. The process of claim 10 wherein the diisocyanate is used at a 5 to 35 percent stoichiometric excess with respect to the sum of the moles of isocyanate reactive groups of the polyalkylene glycol and the capping agent, wherein the polyalkylene glycol is a polyethylene glycol having a $M_w$ in the range of 4000 to 10,000 Daltons; and the hydrophobic agent is a hydrophobic capping agent.

13. The process of claim 12 wherein the hydrophobic capping agent is an alcohol or a tertiary aminoalcohol.

14. The process of claim 13 wherein equivalent ratio of the polyalkylene glycol to the alcohol or tertiary amino alcohol is from 2:1 to 10:1.

15. The process of claim 14 wherein equivalent ratio of the polyalkylene glycol to the alcohol or tertiary amino alcohol is from 3.5:1 to 6.5:1, wherein the hydrophobic capping agent is a tertiary aminoalcohol.

16. The process of claim 15 wherein the hydrophobically modified alkylene oxide poly(urethane-urea-allophanate) further includes primary amine end groups or biuret branch points in the polymer backbone or a combination thereof.

17. The process of claim 10 wherein the polyalkylene glycol, the diisocyanate, and the hydrophobic capping agent or the hydrophobic difunctional agent or a combination thereof are contacted simultaneously under reaction conditions to form the polyurethane prepolymer with isocyanate functionality.

* * * * *